(12) United States Patent
Kosugi

(10) Patent No.: US 10,999,707 B2
(45) Date of Patent: May 4, 2021

(54) POSITION DETERMINATION SYSTEM AND POSITION DETERMINATION METHOD

(71) Applicant: KABUSHIKI KAISHA TOKAI RIKA DENKI SEISAKUSHO, Aichi (JP)

(72) Inventor: Masanori Kosugi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/830,944

(22) Filed: Mar. 26, 2020

(65) Prior Publication Data

US 2020/0322758 A1  Oct. 8, 2020

(30) Foreign Application Priority Data

Apr. 3, 2019 (JP) .............................. JP2019-071567

(51) Int. Cl.
*H04W 4/029* (2018.01)
*G01S 5/14* (2006.01)

(52) U.S. Cl.
CPC ............... *H04W 4/029* (2018.02); *G01S 5/14* (2013.01)

(58) Field of Classification Search
CPC .............. H04W 4/029; H04W 52/0245; H04W 52/245; H04W 56/0095; H04W 72/085; H04W 72/1231; G01S 5/14; G01S 5/0252
See application file for complete search history.

(56) References Cited

U.S. PATENT DOCUMENTS

| 2009/0115658 A1* | 5/2009 | Zimmerman | G01S 19/11 342/357.27 |
| 2012/0202521 A1* | 8/2012 | Shkedi | H04W 4/023 455/456.1 |
| 2013/0015947 A1* | 1/2013 | Best | G01S 19/14 340/5.7 |

FOREIGN PATENT DOCUMENTS

JP        2018-012933        1/2018

* cited by examiner

*Primary Examiner* — Minjung Kim
(74) *Attorney, Agent, or Firm* — Greenblum & Bernstein, P.L.C.

(57) ABSTRACT

A position determination system includes communication units that are arranged on the communication subject and perform wireless communication with a terminal, and a position determination unit arranged on the communication subject. The position determination unit obtains received signal strength indicator data of radio waves transmitted on different frequencies between the terminal and each communication unit and determines the position of the terminal relative to the communication subject from the obtained received signal strength indicator data. The received signal strength indicator data is obtained for each communication unit and indicates the received signal strength indicator of each radio wave measured for each frequency. The communication units are respectively arranged on the communication subject in two divided sections obtained by dividing the communication subject along a reference line extending across the communication subject.

6 Claims, 4 Drawing Sheets

POSITION DETERMINATION SYSTEM AND POSITION DETERMINATION METHOD

BACKGROUND

1. Field

The present disclosure relates to a position determination system and a position determination method that determine the position of a terminal relative to a communication subject through communication between the terminal and the communication subject.

2. Description of Related Art

A known authentication system authenticates a terminal carried by a user through wireless communication between the terminal and an onboard device installed in a vehicle when, for example, the terminal executes control on the vehicle. One example of an authentication system is a smart verification system in which the terminal automatically responds to radio waves transmitted from the onboard device to undergo ID verification (smart verification) through wireless communication.

Further, in a known communication system, a terminal such as a smartphone is used as a vehicle key. Japanese Laid-Open Patent Publication No. 2018-12933 describes a communication system that measures the received signal strength indicator when the terminal receives radio waves transmitted from a communication device installed in the vehicle to determine where the terminal is located by finding a position that corresponds to the received signal strength indicator. Security of the smart system can be improved by authenticating the terminal position determined by a position determination system in addition to performing ID verification.

SUMMARY

Even when the terminal is located at the same position, the received signal strength indicator of the radio waves may vary, for example, when an obstacle blocks the radio waves or when the radio waves are interfered by other radio waves. When the received signal strength indicator is varied, the determined position of the terminal may not be accurate.

In one general aspect, a position determination system includes communication units that are arranged on a communication subject and perform wireless communication with a terminal, and a position determination unit that is arranged on the communication subject and obtains received signal strength indicator data of radio waves transmitted on different frequencies between the terminal and each of the communication units to determine a position of the terminal relative to the communication subject from the obtained received signal strength indicator data. The received signal strength indicator data is obtained for each of the communication units and indicates a received signal strength indicator of each of the radio waves measured for each of the frequencies. One of the communication units is arranged on the communication subject in one of two divided sections obtained by dividing the communication subject along a reference line extending across the communication subject, and another one of the communication units is arranged on the communication subject in the other one of the two divided sections.

In another general aspect, a method for determining a position of a terminal includes transmitting radio waves on different frequencies between the terminal and each of communication units arranged on a communication subject, obtaining received signal strength indicator data of the radio waves, and determining a position of the terminal relative to the communication subject from the obtained received signal strength indicator data. The received signal strength indicator data is obtained for each of the communication units and indicates a received signal strength indicator of each of the radio waves measured for each of the frequencies. One of the communication units is arranged on the communication subject in one of two divided sections obtained by dividing the communication subject along a reference line extending across the communication subject, and another one of the communication units is arranged on the communication subject in the other one of the two divided sections.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary shill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a position determination system will now be described with reference to FIGS. 1 to 7.

Figure 1:
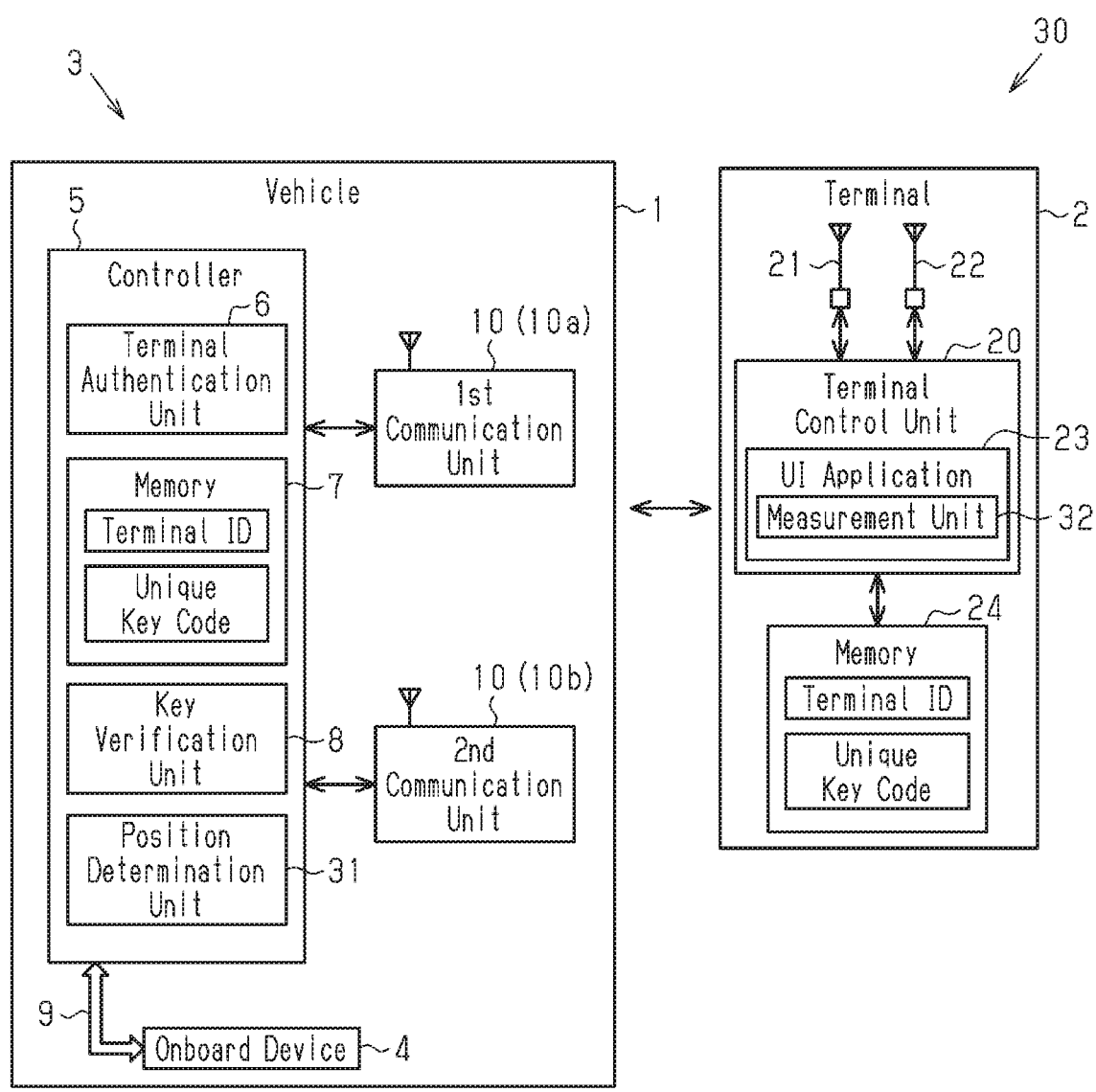
FIG. 1 is a block diagram illustrating the configuration of a position determination system included in an authentication system.

As illustrated in FIG. 1, a vehicle 1 is provided with an authentication system 3 that authenticates a terminal 2 through wireless communication. The vehicle 1 is one example of a communication subject that performs wireless communication with the terminal 2. The term "communication subject" as used in this disclosure is defined as a communication body or communication station that includes a communication device arranged in an interior area (or closed area) that is separated from an exterior area and performs wireless communication with the terminal 2 to systematically perform the various processes described in this disclosure (including verification process, authentication process, position determination process, and the like). In addition to a vehicle, examples of a communication subject include a house, a building, or any other system or device accommodating the communication device. The communication device includes operably connected components, such as one or more communication units (transceiver, transmitter, or receiver) and a controller, that are configured integrally or separately. The one or more communication units may be arranged in an interior area (e.g., passenger compartment) of the communication subject and/or an exterior area (e.g., outside passenger compartment) of the communication subject.

The terminal 2 is, for example, a smartphone, that functions as a telephone and is capable of performing communication with the vehicle 1 through near-field wireless communication. However, the terminal 2 is not limited to a smartphone and may be a tablet or any computing device having a communication function. The authentication system 3 of the present example is a near-field wireless verification system that authenticates the terminal 2 through near-field wireless communication and controls actuation of an onboard device 4. Examples of the onboard device 4 include an engine of the vehicle 1 and a door lock device that controls locking and unlocking of a vehicle door. Near-field wireless communication may be, for example Bluetooth (registered trademark) communication.

The vehicle 1 includes a controller 5 that performs authentication and ID verification of the terminal 2. The controller 5 includes a terminal authentication unit 6 that authenticates the terminal 2 through near-field wireless communication. The controller 5 includes a memory 7 that stores a terminal ID and a unique key code of the terminal 2 used when authenticating the terminal 2 through near-field wireless communication. The controller 5 may include a key verification unit 8 that performs ID verification on an electronic key (not illustrated). The electronic key functions as a vehicle key of the vehicle 1. The controller 5 is connected to the onboard device 4 by a communication line 9. The communication line 9 is formed by, for example a controller area network (CAN) and/or a local interconnect network (LIN). The key verification unit 8 performs smart verification through wireless communication with the electronic key to permit or perform locking or unlocking of a door or starting of the engine when smart verification is accomplished.

The vehicle 1 includes a plurality of (e.g., two) communication units 10 to perform near-field wireless communication with the terminal 2. The communication units 10 perform, for example, Bluetooth Low Energy (BLE) communication with the terminal 2. Typically, in BLE communication, in response to an advertising packet from a slave device, a master device establishes BLE communication connection. In the present example, during BLE communication, the terminal 2 serves as the master device, and the vehicle 1 serves as the slave device. Instead, the vehicle 1 may serve as the master device, and the terminal 2 may serve as the slave device.

The terminal 2 includes a terminal control unit 20, a network communication unit 21 that performs communication through a network such as the Internet with an external device such as a server (not illustrated), and a terminal communication unit 22 that performs near-field wireless communication with the vehicle 1. The terminal control unit 20 includes a user interface (UI) application 23 that manages actuation of the authentication system 3 in the terminal 2.

The UI application 23 is, for example, downloaded from the server through network communication and installed in the terminal. The terminal control unit 20 uses the UI application 23 to perform ID verification and authentication of the terminal 2 through communication with the vehicle 1 in order to allow various processes to be performed, such as the locking or unlocking of a vehicle door and the starting of the engine.

The terminal 2 includes a memory 24 that stores the terminal ID and unique key code registered to the terminal 2. The terminal 2 obtains the terminal ID and the unique key code through, for example, network communication. The terminal ID and the unique key code may be distributed to the terminal 2 as, for example, temporary key code information such as a one-time key code. Further, when registering the terminal 2 as a vehicle key to the vehicle 1, the terminal 2 registers the terminal ID and unique key code of the terminal 2 to the vehicle 1 by connecting to the vehicle 1 through BLE communication.

When, for example, registration of the terminal 2 to the vehicle 1 is completed and BLE communication connection between the terminal 2 and the vehicle 1 is established, the terminal authentication unit 6 receives and verifies the terminal ID from the terminal 2 and uses the unique key code to perform code authentication such as challenge-response authentication. When the terminal authentication unit 6 accomplishes terminal ID verification and code authentication, the key verification unit 8 performs ID verification on the electronic key through wireless communication with the electronic key (not illustrated). Then, when the key verification unit 8 accomplishes ID verification, the terminal 2 is authenticated thereby allowing the door to be locked or unlocked and the engine to be started. Preferably, the series of authentication and ID verification processes are automatically executed without the user operating the terminal 2 or the vehicle 1.

The authentication system 3 includes a position determination system 30 that determines the position of the terminal 2 when communication is established between the vehicle 1 and the terminal 2. In the present example, the position determination system 30 determines the position of the terminal 2 relative to the vehicle 1 from the radio waves transmitted between the communication units 10 and the terminal 2 when the vehicle 1 performs ID verification on the terminal 2. The position determination may be performed any time when communication for ID verification is performed. That is, position determination may be performed before, after, or during ID verification.

Figure 2:
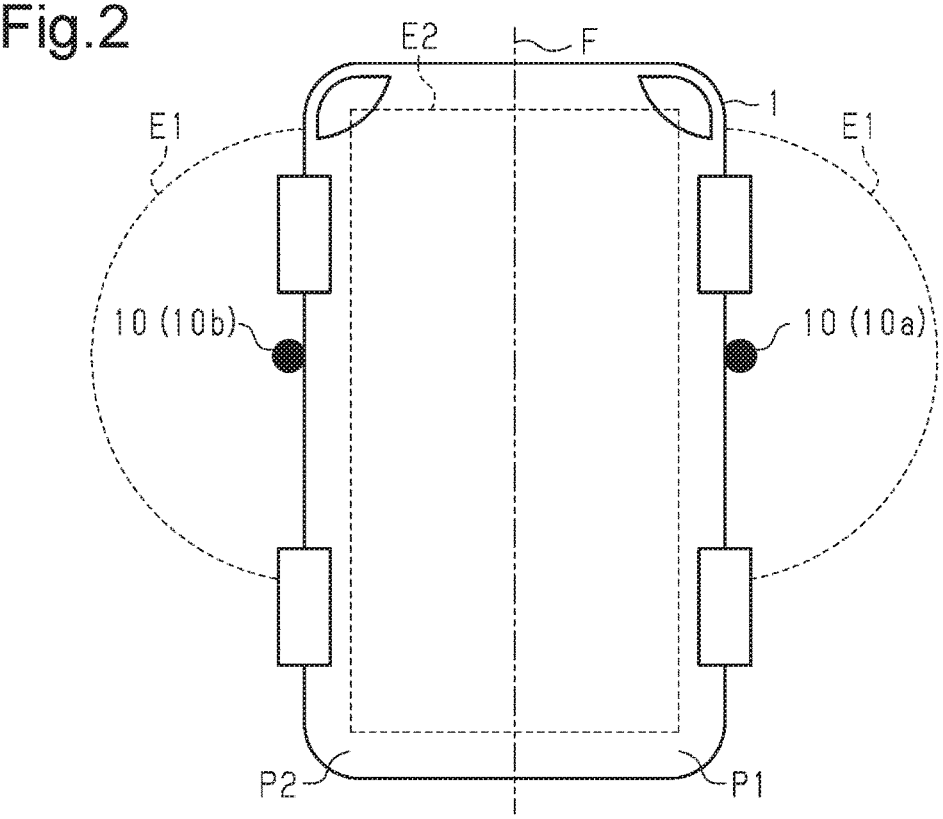
FIG. 2 is a diagram illustrating where communication units are located in a vehicle.

Referring to FIG. 2, position determination is performed to determine which one of communications areas formed by the communication units 10 the terminal 2 is located in. The vehicle 1 is divided into two divided sections by a reference line F extending across the vehicle 1, and the communication units 10 are respectively disposed in the two divided sections. In the present example, the reference line F is the front-rear direction of the vehicle 1 and divides the vehicle 1 into a right divided section P1 and a left divided section P2. The communication units 10 include a first communication unit 10a located in the right divided section P1 of the vehicle 1 outside the passenger compartment and a second communication unit 10b located in the left divided section P2 of the vehicle 1 outside the passenger compartment.

The first communication unit 10a and the second communication unit 10b are arranged in symmetry with respect to the reference line F that divides the vehicle 1. The reference line F is the boundary between the right divided section P1 and the left divided section P2 in a plan view of the vehicle 1. The first communication unit 10a and the second communication unit 10b may be arranged in symmetry with respect to, for example, a dividing plane that divides the vehicle 1 along the reference line F. The first communication unit 10a and the second communication unit 10b are disposed on, for example, door handles of the vehicle 1. The first communication unit 10a forms an exterior area E1 at the right side of the vehicle 1 outside the passenger compartment, and the second communication unit 10b forms an exterior area E1 at the left side of the vehicle 1 outside the passenger compartment. Further, the first and second communication units 10a and 10b form an interior area E2 inside the passenger compartment of the vehicle 1. The interior area E2 is located between the first and second communication units 10a and 10b, which are arranged in symmetry with respect to the vehicle 1, and the exterior areas E1 are located at the outer side of the interior area E2. The interior area E2 is a space blocked by the vehicle body from the outside of the passenger compartment.

As illustrated in FIG. 1, the position determination system 30 includes a position determination unit 31 that determines the position of the terminal 2 relative to the vehicle 1. The position determination unit 31 is included in the controller 5 of the vehicle 1. The position determination unit 31 transmits a position detection signal Sd on radio waves from each communication unit 10 through BLE communication, in the series of position determination processes, the first communication unit 10a and the second communication unit 10b each transmit the position detection signal Sd a number of times. Bluetooth communication has a frequency hopping function that switches channels during the transmission of radio waves. The first communication unit 10a and the second communication unit 10b transmit the position detection signal Sd with the same amount of power.

The position determination system 30 includes a measurement unit 32 that measures the received signal strength indicator of the radio waves transmitted from the communication units 10a and 10b to the terminal 2 for each radio wave frequency. In the present example, the measurement unit 32 measures the received signal strength indicator (RSSI) of the position detection signal Sd from the first communication unit 10a and the second communication unit 10b when the terminal 2 receives the position detection signal Sd. In the present example, the measurement unit 32 measures a received signal strength indicator R1 of the position detection signal Sd transmitted from the first communication unit 10a and a received signal strength indicator R2 of the position detection signal Sd transmitted from the second communication unit 10b. The measurement unit 32 obtains the frequency of each position detection signal Sd when measuring the received signal strength indicator of the position detection signal Sd. When the position detection signal Sd is transmitted through BLE communication like in the present embodiment, frequency information may be obtained as a channel number. The measurement unit 32 transmits the measured received signal strength indicator and the corresponding frequency to the controller 5.

The position determination unit 31 receives each set of the measured received signal strength indicator and the corresponding frequency for each of the first communication unit 10a and the second communication unit 10b from the measurement unit 32 to obtain received signal strength indicator data for each of the communication units 10a and 10b. The position determination system 30 determines whether the terminal 2 is located in the exterior area E1 or the interior area E2 from the obtained received signal strength indicator.

The operation of the position determination system 30 will now be described with reference to FIGS. 3 to 7.

Figure 3:
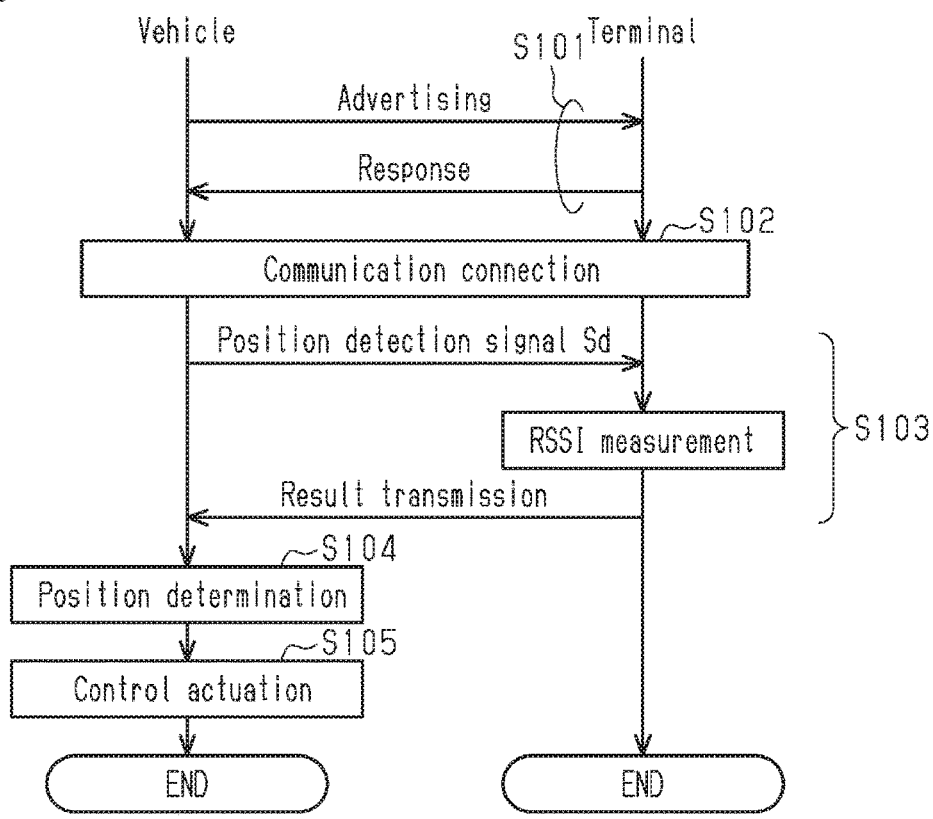
FIG. 3 is a flowchart illustrating position determination.

As illustrated in FIG. 3, in step S101, to establish BLE communication connection with the terminal 2, the controller 5 of the vehicle 1 repetitively transmits advertising packets from each communication unit 10 to the area around the vehicle 1. When the terminal 2 enters the area around the vehicle 1 and receives an advertising packet, the terminal 2 transmits a response to the communication unit 10 that corresponds to the area that the terminal 2 entered. This establishes BLE communication connection between the vehicle 1 and the terminal 2.

In step S102, the vehicle 1 and the terminal 2 performs device authentication (e.g., address authentication) through a series of communication connection processes performed after receiving the advertising packet and automatically starts communication connection. The communication connection is continued until the terminal 2 moves out of the range of near-field wireless communication with the vehicle 1.

In step S103, the position determination unit 31 transmits the position detection signal Sd through BLE communication from the first communication unit 10a and the second communication unit 10b. The measurement unit 32 of the terminal 2 measures the received signal strength indicator of each position detection signal Sd and sends the measurement result to the vehicle 1. The position detection signal Sd may include an antenna ID indicating the communication unit 10 from where the position detection signal Sd originated so that the terminal 2 can determine from the position detection signal Sd which one of the first and second communication units 10a and 10b sent the position detection signal Sd. The first and second communication units 10a and 10b can transmit the position detection signal Sd at different times or in different frequencies so that the terminal 2 can easily identify the position detection signal Sd. When the measurement unit 32 receives the position detection signal Sd, the measurement unit 32 measures the received signal strength indicator of the position detection signal Sd and obtains the frequency of the position detection signal Sd. The measurement unit 32 notifies the first communication unit 10a and the second communication unit 10b of the received signal strength indicator and the corresponding frequency.

In the present example, the series of processes including the transmission of the position detection signal Sd, the measurement of the received signal strength indicator, and the notification of the received signal strength indicator are repetitively performed while changing the frequency of the position detection signal Sd transmitted from the first and second communication units 10a and 10b. In the present example, the channel is switched by the frequency hopping function of BLE communication when the position detection signal Sd is repetitively transmitted, and the measurement unit 32 obtains the channel number when measuring the received signal strength indicator of the position detection signal Sd. As a result, the position determination unit 31 obtains received signal strength indicator data of the position detection signal Sd that is transmitted from the first communication unit 10a as data including the channel number, which indicates the frequency of the position detection signal Sd, and the received signal strength indicator R1, which is associated with the channel number. In the same manner, the position determination unit 31 obtains received signal strength indicator data of the position detection signal Sd that is transmitted from the second communication unit 10b as data including the channel number, which indicates the frequency of the position detection signal Sd, and the received signal strength indicator R2, which is associated with the channel number.

Figure 4:
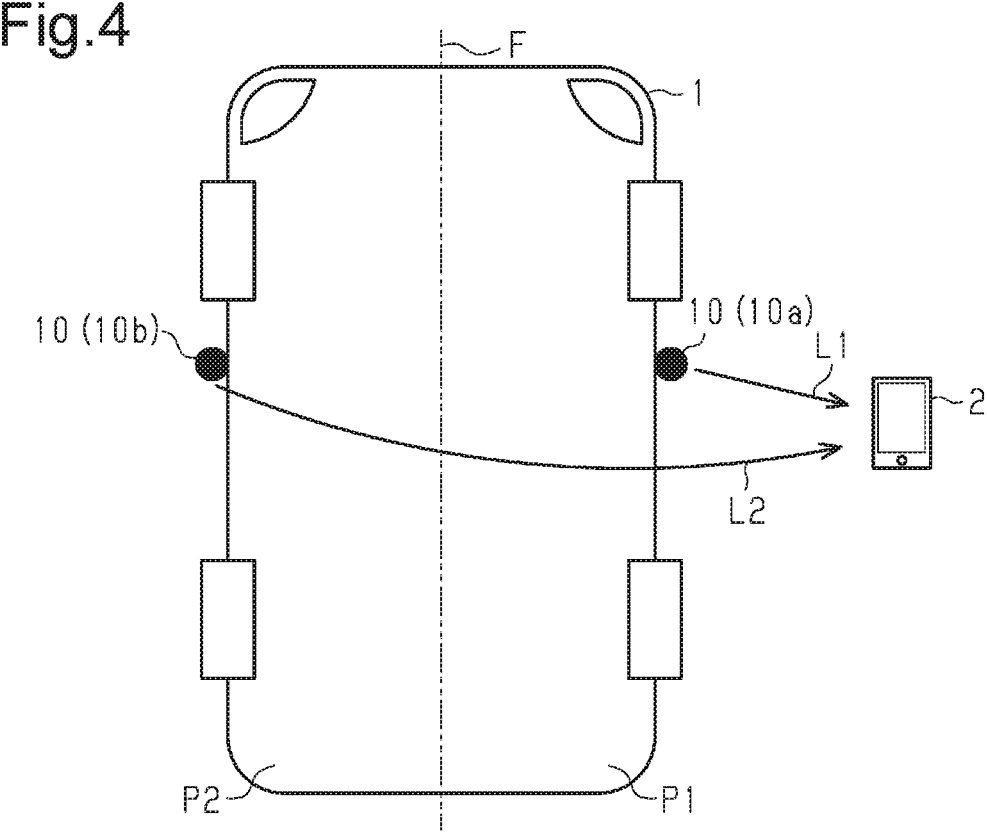
FIG. 4 is a diagram illustrating radio wave propagation paths when a terminal located outside the vehicle.

As illustrated in FIG. 4, for example, when the terminal 2 is located outside the passenger compartment at the right side of the vehicle 1, a propagation path L1 of radio waves between the first communication unit 10a and the terminal 2 and a propagation path L2 of radio waves between the second communication unit 10b and the terminal 2 are formed between the vehicle 1 and the terminal 2. The propagation paths L1 and L2 include propagation paths in which the position detection signal Sd transmitted from the corresponding communication unit 10 is propagated on direct waves, diffracted waves, and/or reflected waves. When the terminal 2 is located outside the passenger compartment at the right side of the vehicle 1, the propagation path L1 is mainly formed by direct waves, and the propagation path L2 is mainly formed by diffracted waves and reflected waves. The received signal strength indicator differs in level in accordance with the propagation path (i.e., direct waves, diffracted waves, or reflected waves) and indicates inter-channel characteristics (frequency characteristics) such as variations in the received signal strength indicator for each channel in accordance with the propagation path.

Figure 5:
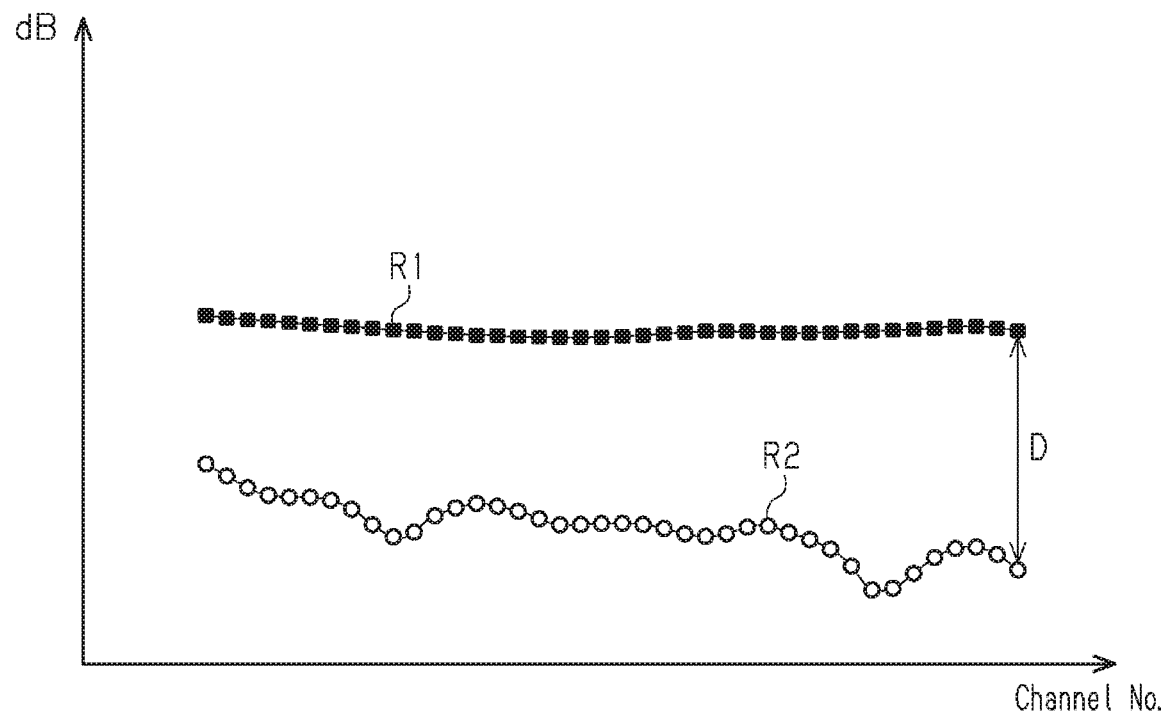
FIG. 5 is a graph illustrating received signal strength indicator data when the terminal is located outside the vehicle.

As illustrated in FIG. 5, when the terminal 2 is located outside the passenger compartment of the vehicle 1, the received signal strength indicator data corresponding to the received signal strength indicator R1 obtained from the propagation path L1 has characteristics that differ from the received signal strength indicator data corresponding to the received signal strength indicator R2 obtained from the propagation path L2. In the present example, the received signal strength indicator data indicates the level of received signal strength indicator and the inter-channel characteristics that represents the relationship of received signal strength indicators and channel numbers. The received signal strength indicator differs in level and inter-channel characteristics between the propagation paths L1 and L2. As illustrated in FIG. 4, when the terminal 2 is located outside the passenger compartment at the right side of the vehicle 1, the received signal strength indicator R1 is always greater than the received signal strength indicator R2. Further, the inter-channel characteristics of the received signal strength indicator R1 have smaller variations that that of the received signal strength indicator R2. The difference between the received signal strength indicators R1 and R2 will be referred to as difference D.

Figure 6:
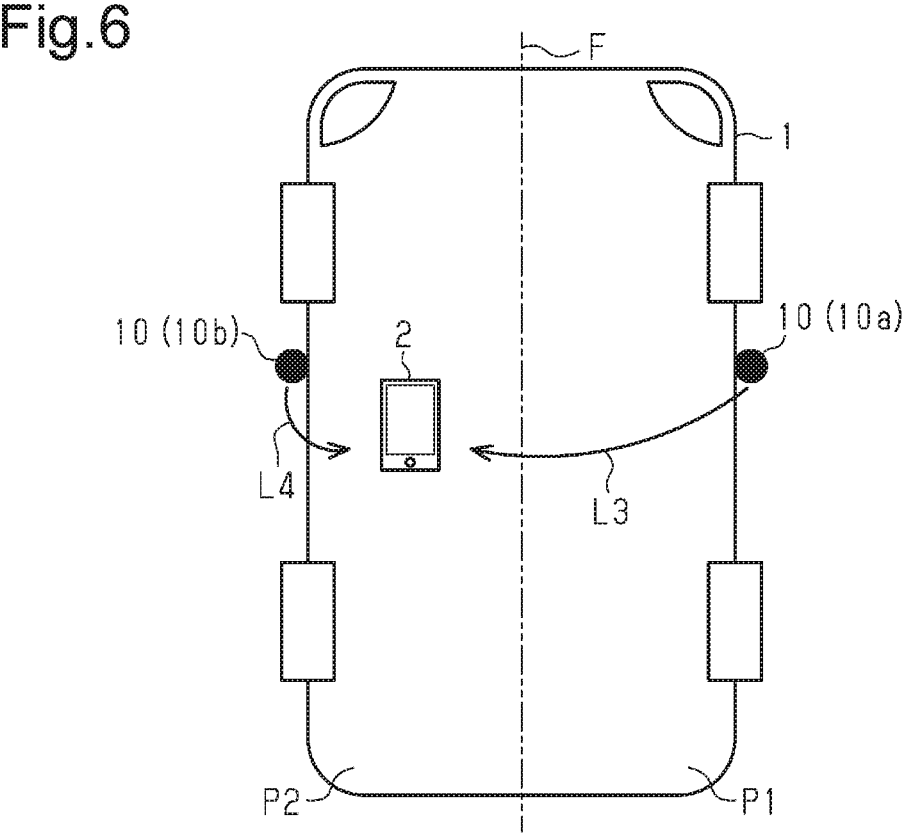
FIG. 6 is a diagram illustrating radio wave propagation paths when a terminal is located inside the vehicle.

As illustrated in FIG. 6, when the terminal 2 is located inside the passenger compartment of the vehicle 1, a propagation path L3 of radio waves between the first communication unit 10a and the terminal 2 and a propagation path L4 of radio waves between the second communication unit 10b and the terminal 2 are formed between the vehicle 1 and the terminal 2. In the present embodiment, in which the communication units 10 are located outside the passenger compartment, the position detection signal Sd enters the passenger compartment through a transmissive portion of the vehicle body that transmits radio waves and is diffracted by a non-transmissive portion that does not transmit radio waves. One example of the transmissive portion is a door glass of the vehicle 1. One example of the non-transmissive portion is a door panel of the vehicle 1. When the communication units 10 are arranged on the outer door handles of the vehicle 1, the position detection signal Sd is diffracted at the border between the door panel and the door glass thereby entering the passenger compartment through the door glass. Accordingly, the propagation paths L3 and L4 are mainly formed by diffracted waves.

Figure 7:
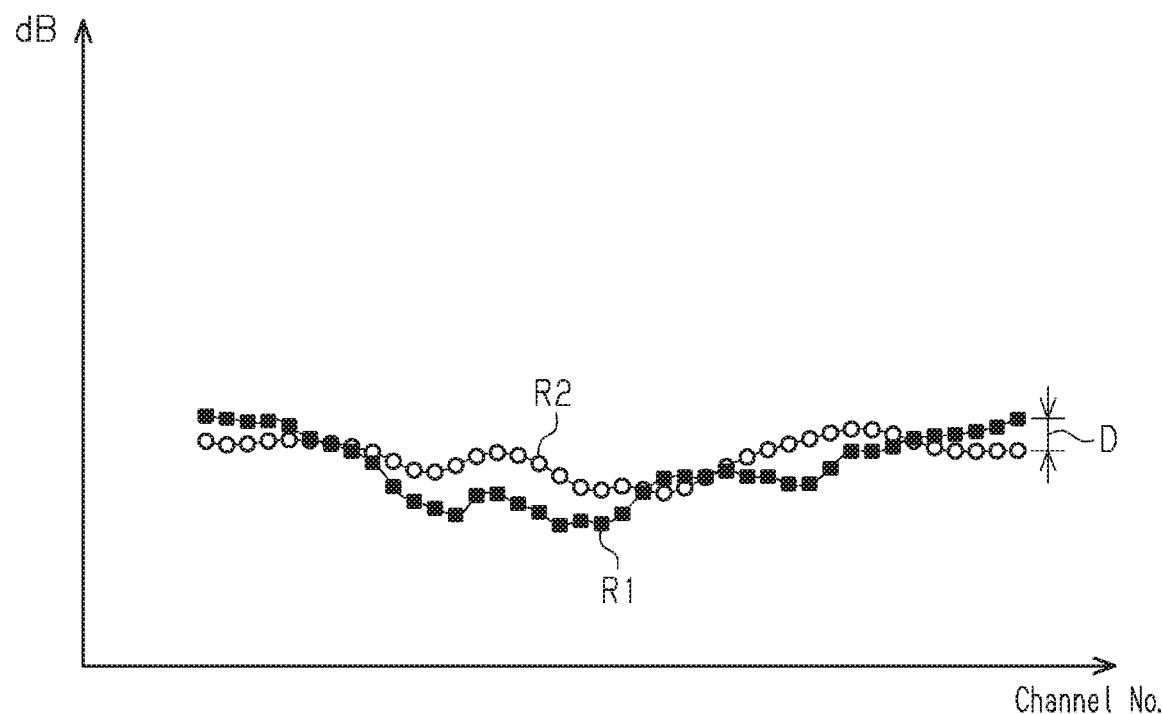
FIG. 7 is a graph illustrating received signal strength indicator data when the terminal is located inside the vehicle.

As illustrated in FIG. 7, when the terminal 2 is located inside the passenger compartment of the vehicle 1, the received signal strength indicator data corresponding to the received signal strength indicator R1 obtained from the propagation path L3 has characteristics that are more approximate to the received signal strength indicator data corresponding to the received signal strength indicator R2 obtained from the propagation path L4 than when the terminal 2 is located outside the passenger compartment of the vehicle 1. That is, the received signal strength indicators R1 and R2 are approximate to each other in level and have approximate inter-channel characteristics. When the terminal 2 is located inside the passenger compartment of the vehicle 1, the difference D is small between the received signal strength indicators R1 and R2 of the same channel number. In this manner, the difference in the received signal strength indicator data from the communication units 10 between when the terminal 2 is located outside the passenger compartment of the vehicle 1 and when the terminal 2 is located inside the passenger compartment of the vehicle 1 can be used to determine the position of the terminal 2.

Referring to FIG. 3, in step S104, the position determination unit 31 determines the position of the terminal 2 from the obtained received signal strength indicator data by determining whether the received signal strength indicator data is approximate between the first and second the communication units 10a and 10b. The position determination unit 31 calculates the difference D between the received signal strength indicators R1 and R2 of the same channel and then determines whether the calculated difference D is less than or equal to a threshold value. Further, the position determination unit 31 counts the number of channels in which the difference D is determined as being less than or equal to the threshold value. Then, when the number of channels in which the difference D is less than or equal to the threshold value becomes greater than or equal to a certain number, the position determination unit 31 determines that the received signal strength indicator data is approximate between the received signal strength indicators R1 and R2. When the position determination unit 31 determines that the received signal strength indicator data is not approximate between the received signal strength indicators R1 and R2, the position determination unit 31 determines that the terminal 2 is located in the exterior area E1. When the position determination unit 31 determines that the received signal strength indicator data is approximate between the received signal strength indicators R1 and R2, the position determination unit 31 determines that the terminal 2 is located in the interior area E2.

The received signal strength indicator of the position detection signal Sd is varied by obstacles that block signals or by interference from other radio waves. The received signal strength indicator decreases when, for example, the terminal 2 is covered by an obstacle such as a bag of the user. Thus, if the position of the terminal 2 were to be determined from whether the received signal strength indicators R1 and R2 exceed threshold values, the position determination result of the terminal 2 will change even though the terminal 2 is located at the same position when the received signal strength indicator varies.

In contrast, the position determination unit 31 checks whether the received signal strength indicator data is approximate between the received signal strength indicators R1 and R2 in the present example to determine the position of the terminal 2. In this case, even when the terminal 2 is covered by an obstacle, such as a bag of the user, the position detection signal Sd from both of the first and second communication units 10*a* and 10*b* is blocked. This lowers both of the received signal strength indicators R1 and R2. Thus, the received signal strength indicator data of the received signal strength indicators remains approximate. Accordingly, position determination can be performed with high accuracy by checking whether the received signal strength indicator data is approximate between the received signal strength indicators.

In step S105, the controller 5 controls actuation of the vehicle 1 in accordance with the position of the terminal 2 that is determined by the position determination unit 31. For example, when ID verification is accomplished and the controller 5 determines that the terminal 2 is located in exterior area E1, the controller 5 permits locking or unlocking of the vehicle door. Further, when ID verification is accomplished and the controller 5 determines that the terminal 2 is located in the interior area E2, the controller 5 permits starting of the engine, in this manner, the onboard device 4 is controlled in accordance with the position of the terminal 2 determined by the position determination system 30. The ID verification may be performed before, after, or during the position determination.

The position determination system 30 of the present embodiment has the advantages described below.

(1) The position determination system 30 includes the first and second communication units 10*a* and 10*b*, which are arranged in the vehicle 1 and establish wireless communication with the terminal 2, and the position determination unit 31, which is arranged in the vehicle 1. The communication units 10*a* and 10*b* are respectively arranged in the two divided sections P1 and P2 of the vehicle 1 defined by the reference line F extending across the vehicle 1. The position determination unit 31 obtains the received signal strength indicator data of the radio waves transmitted in different frequencies from the communication units 10*a* and 10*b* to the terminal 2 to determine the position of the terminal 2 relative to the vehicle 1 from the obtained received signal strength indicator data. The received signal strength indicator data is obtained for each of the communication units 10*a* and 10*b* and indicate the measured received signal strength indicator of the radio wave for each frequency. With this configuration, the communication units 10*a* and 10*b*, which are located in the different divided sections P1 and P2, allow the position of the terminal 2 to be determined from the difference in the received signal strength indicator data corresponding to variations in the propagation paths between the terminal 2 and the communication units 10. Further, the received signal strength indicator data is obtained from a plurality received signal strength indicator measurements. Thus, the influence of variations in the received signal strength indicator is reduced. This improves the position determination accuracy of the terminal 2.

(2) The communication units 10 are arranged on the vehicle 1 outside the passenger compartment. With this configuration, the received signal strength indicator data differs between when the terminal 2 is located inside the passenger compartment of the vehicle 1 and when the terminal 2 is located outside the passenger compartment of the vehicle 1. This allows the position determination unit 31 to determine whether the terminal 2 is located inside or outside the passenger compartment.

(3) The first and second communication units 10*a* and 10*b* are arranged in symmetry with respect to the reference line F that divides the vehicle 1. With this configuration, a first communication area (right area E1 in FIG. 2) is formed by the first communication unit 10*a* at the side opposite to the second communication unit 10*b*, a second communication area (left area E1 as viewed in FIG. 2) is formed by the second communication unit 10*b* at the side opposite to the first communication unit 10*a*, and a third communication area E2 in FIG. 2) is formed between the first and second communication areas. This allows the position determination unit 31 to determine with the communication units 10*a* and 10*b* which one of the first to third communication areas the terminal 2 is located in.

(4) The vehicle 1 includes the transmissive portion (e.g., door glass or the like) that transmits radio waves and the non-transmissive portion (e.g., door panel or the like) that does not transmit radio waves. Further, the communication units 10 are arranged on the non-transmissive portion of the vehicle 1. With this configuration, when radio waves are propagated through the transmissive portion, radio waves are diffracted at the border between the transmissive portion and the non-transmissive portion and then transmitted through the transmissive portion. Accordingly, diffraction at the non-transmissive portion easily produces a difference in the received signal strength indicator data between when the terminal 2 is located inside the passenger compartment of the vehicle 1 and when the terminal 2 is located outside the passenger compartment of the vehicle 1. This improves the position determination accuracy when determining whether the terminal 2 is located inside or outside the passenger compartment.

(5) The position determination unit 31 determines the position of the terminal 2 by checking whether first received signal strength indicator data of the radio waves transmitted from the first communication unit 10*a* located in the right divided section P1 is approximate to second received signal strength indicator data of the radio waves transmitted from the second communication unit 10*b* located in the left divided section P2. With this structure, the approximate characteristics of the received signal strength indicator data remain the same when the terminal 2 is located at the same position even if, for example, radio waves are block by an obstacle. This avoids situations in which determination results change depending on whether there is an obstacle.

(6) The position determination unit 31 compares the received signal strength indicator R1 of the radio waves transmitted from the first communication unit 10*a* and the received signal strength indicator R2 of the radio waves transmitted from the second communication unit 10*b* for each frequency to determine whether the first received signal strength indicator data and the second received signal strength indicator data are approximate when the difference D1 in the received signal strength indicators R1 and R2 are less than or equal to the difference D. With this configuration, the determination of whether the received signal strength indicator data is approximate can be performed through a simple process of calculating the difference D1 between the received signal strength indicators R1 and R2 for each frequency.

(7) The communication units 10 (10*a* and 10*b*) are located in the right divided section P1 and the left divided section P2 of the vehicle 1, which are defined by the reference line F. With this configuration, the position determination unit 31 can determine whether the terminal 2 is located outside or inside the passenger compartment of the vehicle 1.

The above embodiment may be modified as described below. The above-described embodiments and the modified examples described below may be combined as long as there is no technical contradiction.

The controller 5 and/or the terminal control unit 20 included in the position determination system 30 (authentication system 3) may be configured as a computer system including one or more processors and a non-transitory memory storing instructions that can be executed by the processors to implement the various processes of the present disclosure (verification process, authentication process, position determination process, and the like). Alternatively, the controller 5 and/or the terminal control unit 20 may be configured by dedicated hardware such as an application specific integrated circuit (ASIC).

Communication Units 10

The communication units 10 may be arranged on a transmissive portion near the border between the transmissive portion and the non-transmissive portion. For example, the communication units 10 may be arranged on a pillar of the vehicle 1.

The communication units 10 do not have to be arranged in symmetry with respect to the dividing plane that divides the vehicle 1 along the reference line F. For example, the communication units 10 may be arranged at positions located at different heights. More specifically, symmetric with respect to the reference line F may mean symmetric with respect to a dividing plane or symmetric in a plan view.

The communication units 10 do not have to be arranged in symmetry with respect to the reference line F that divides the vehicle 1. For example, the communication units 10 can be arranged at positions separated in the front-rear direction of the vehicle 1.

The communication units 10 may be disposed inside the passenger compartment.

The two divided parts in which the communication units 10 are arranged do not have to be the left and right sides of the vehicle 1 and may be the front and rear sides of the vehicle 1 or parts dividing the vehicle 1 in another direction. The two divided sections may be set in accordance with the specification.

The parts in which the communication units 10 are arranged do not have to be equally divided sections of the vehicle 1.

Position Determination Unit 31

The determination of the received signal strength indicator data is not limited to the process using the difference D.

The position determination unit 31 does not have to check whether the received signal strength indicator data is approximate. For example, the position determination unit 31 may use the maximum value of the difference D to determine the position of the terminal 2.

The received signal strength indicator data does not have to indicate the level of the received signal strength indicator and the inter-channel characteristics. For example, the received signal strength indicator data may indicate a means value, a median value, a mode value, a standard deviation, or the like.

The measurement unit 32 may be arranged in the vehicle 1. For example, the terminal 2 may transmit the position detection signal Sd, and each communication unit 10 of the vehicle 1 may receive the position detection signal Sd and measure the received signal strength indicator. In this case, each communication unit 10 functions as the measurement unit 32.

The position determination unit 31 may be arranged in the terminal 2. More specifically, the terminal 2 may receive the received signal strength indicator from the vehicle 1 to determine the position of the terminal 2.

The position determination unit 31 does not have to determine whether the terminal 2 is located in the exterior area E1 or the interior area E2 of the vehicle 1. The position determination unit 31 may determine whether the terminal 2 is located at the driver seat side or passenger seat side of the vehicle 1 or determine whether the terminal 2 is located at the front side or rear side of the vehicle 1. Alternatively, the position determination unit 31 may determine the coordinates of the terminal 2 relative to the vehicle 1.

The interval at which the communication units 10 are transmitted from the position detection signal Sd is not particularly limited and may be varied in accordance with the specification of the position determination system 30.

The position detection signal Sd does not have to include the antenna. ID indicating its origination. For example, the position determination unit 31 may control the transmission time of the position detection signal Sd and refer to the time at which the received signal strength indicator data was received to determine the antenna (communication unit 10) that transmitted the position detection signal Sd. Alternatively, the position determination unit 31 may determine the communication unit 10 that transmitted the position detection signal Sd by receiving the received signal strength indicator data with the same antenna that transmitted the position detection signal Sd.

The first and second communication units 10a and 10b may simultaneously transmit a set of position detection signals Sd on different channels.

The position detection signal Sd does not have to be transmitted after communication-connecting the communication units 10 and the terminal 2 (S102 in FIG. 3). A signal used during or before communication-connection (S102) may be used as the position detection signal Sd.

The frequency of each position detection signal Sd does not have to be in accordance with the channel determined by the frequency hopping of BLE communication.

The position determination unit 31 does not have to perform determinations using all of the channels obtained through frequency hopping. For example, the received signal strength indicator may be measured for some of the channels to estimate the received signal strength indicator data from the received signal strength indicator with an approximation line and determine approximation of the received signal strength indicator data with the distance of the approximation line.

OTHER EXAMPLES

The system for verifying the electronic key is not particularly limited and may be, for example, a smart verification system for a low frequency (LF) to an ultrahigh frequency (UHF) or a system that uses another frequency band.

The authentication system 3 can be a system capable of actuating the vehicle 1 with only the terminal 2. That is, the terminal 2 may have all of the functions of an electronic key (vehicle key). In this case, the key verification unit 8 can be omitted.

The controller 5 can include an additional communication unit functioning as a master communication unit that controls the communication unit 10.

The terminal authentication unit 6 can be arranged in one of the communication units 10.

The terminal authentication unit 6 does not have to be arranged in the controller 5 and may be configured separately from the controller 5. When the terminal authentication unit 6 is configured separately from the controller 5, the terminal authentication unit 6 may perform communication with the controller 5 through wired-connection or wireless connection. This allows, for example, the terminal authentication unit 6 to be arranged in one of the communication units 10.

The key verification unit 8 may be separate from the controller 5.

The communication protocol and bandwidth of the authentication system 3 and the position determination system 30 are not particularly limited. For example, Wi-Fi (registered trademark) or Zigbee (registered trademark) may be employed. Further, the authentication system 3 and the position determination system 30 may use different bandwidths.

The process for performing communication connection (pairing) for near-field wireless communication between the vehicle 1 and the terminal 2 is not particularly limited. For example, pairing may be performed by only one of the vehicle 1 and the terminal 2. When pairing is performed by only the vehicle 1, a car navigation system installed in the vehicle 1 may be used as an input/output device. When performing pairing, the operated device, operating method, and authentication method may be changed.

The terminal 2 does not have to obtain the terminal ID and the unique key code from a server through network communication. For example, a terminal ID and unique key code registered to the vehicle 1 may be assigned to the terminal 2 by logging into (user ID and password authentication) the vehicle 1 through BLE communication.

The ID verification performed by the authentication system 3 is not limited to ID verification of the electronic key and code verification of the unique key code and only needs to check the authenticity of the terminal 2.

In the series of authentication, the order of ID verification and position detection is not particularly limited. For example, ID verification may be performed before or after position detection. Further, the period during which ID verification is performed may be overlapped with the period during which position detection is performed.

The terminal 2 is not limited to a smartphone and may be an electronic key associated with the vehicle 1.

The authentication system 3 and the position determination system 30 do not have to be installed in the vehicle 1 and may be installed in various types of devices or apparatuses.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A position determination system comprising:
communication units that are arranged on a communication subject and perform wireless communication with a terminal; and
a position determination unit that is arranged on the communication subject and obtains received signal strength indicator data of radio waves transmitted on different frequencies between the terminal and each of the communication units to determine a position of the terminal relative to the communication subject from the obtained received signal strength indicator data,
wherein the received signal strength indicator data is obtained for each of the communication units and indicates a received signal strength indicator of each of the radio waves measured for each of the frequencies,
one of the communication units is arranged on the communication subject in one of two divided sections obtained by dividing the communication subject along a reference line extending across the communication subject, and another one of the communication units is arranged on the communication subject in the other one of the two divided sections,
the communication units include a first communication unit located in one of the two divided sections and a second communication unit located in the other one of the two divided sections,
the position determination unit determines the position of the terminal by checking whether first received signal strength indicator data of radio waves transmitted from the first communication unit is approximate to second received signal strength indicator data of radio waves transmitted from the second communication unit, and
the position determination unit compares the received signal strength indicator of the radio waves transmitted from the first communication unit and the received signal strength indicator of the radio waves transmitted from the second communication unit for each of the frequencies and
determines that the first received signal strength indicator data and the second received signal strength indicator data are approximate when a difference in the received signal strength indicator for each of the frequencies is less than or equal to a predetermined threshold value.

2. The position determination system according to claim 1, wherein
the communication subject includes an interior area that is separated from an exterior area, and
the communication units are arranged on the communication subject in the exterior area.

3. The position determination system according to claim 1, wherein the communication units are arranged in symmetry with respect to the reference line that divides the communication subject.

4. The position determination system according to claim 1, wherein
the communication subject includes a transmissive portion that transmits the radio waves and a non-transmissive portion that does not transmit the radio waves, and
the communication units are arranged on the non-transmissive portion of the communication subject.

5. The position determination system according to claim 1, wherein
the communication subject is a vehicle, and
one of the communication units is arranged in one of the two divided sections located in a left side of the vehicle and another one of the communication units is arranged in the other one of the two divided sections located in a right side of the vehicle.

6. A method for determining a position of a terminal, the method comprising:
transmitting radio waves on different frequencies between the terminal and each of communication units arranged on a communication subject;
obtaining received signal strength indicator data of the radio waves; and determining a position of the terminal relative to the communication subject from the obtained received signal strength indicator data, wherein the received signal strength indicator data is obtained for each of the communication units and indicates a received signal strength indicator of each of the radio waves measured for each of the frequencies, one of the communication units is arranged on the communication subject in one of two divided sections obtained by dividing the communication subject along a reference line extending across the communication subject, and another one of the communication units is arranged on the communication subject in the other one of the two divided sections, the communication units include a first communication unit located in one of the two divided sections and a second communication unit located in the other one of the two divided sections, the determining a position of the terminal includes determining the position of the terminal by checking whether first received signal strength indicator data of radio waves transmitted from the first communication unit is approximate to second received signal strength indicator data of radio waves transmitted from the second communication unit, and the checking includes comparing the received signal strength indicator of the radio waves transmitted from the first communication unit and the received signal strength indicator of the radio waves transmitted from the second communication unit for each of the frequencies, and determining that the first received signal strength indicator data and the second received signal strength indicator data are approximate when a difference in the received signal strength indicator for each of the frequencies is less than or equal to a predetermined threshold value.

* * * * *